US012674645B2

(12) United States Patent
Rumble et al.

(10) Patent No.: US 12,674,645 B2
(45) Date of Patent: Jul. 7, 2026

(54) ANTENNA POSITIONING SYSTEM

(71) Applicant: Antenna Dynamics Ltd, Cowfold (GB)

(72) Inventors: Adrian Rumble, Cowfold (GB); Kevin Fisher, Cowfold (GB)

(73) Assignee: Antenna Dynamics Ltd, Cowfold (GB)

( * ) Notice: Subject to any disclaimer, the term of this patent is extended or adjusted under 35 U.S.C. 154(b) by 230 days.

(21) Appl. No.: 18/267,747

(22) PCT Filed: Dec. 15, 2021

(86) PCT No.: PCT/GB2021/053307
§ 371 (c)(1),
(2) Date: Jun. 15, 2023

(87) PCT Pub. No.: WO2022/129904
PCT Pub. Date: Jun. 23, 2022

(65) Prior Publication Data
US 2024/0102774 A1 Mar. 28, 2024

(30) Foreign Application Priority Data
Dec. 15, 2020 (GB) ..................................... 2019804

(51) Int. Cl.
*F41G 7/00* (2006.01)
*B25J 9/00* (2006.01)
*G01S 7/40* (2006.01)

(52) U.S. Cl.
CPC ............ *F41G 7/003* (2013.01); *B25J 9/0078* (2013.01); *G01S 7/4095* (2021.05)

(58) Field of Classification Search
CPC ............................ H01Q 1/1264; H01Q 9/145
See application file for complete search history.

(56) References Cited

U.S. PATENT DOCUMENTS 3,548,310 A * 12/1970 Fenwick ................ G01R 29/10
343/703
4,823,132 A 4/1989 Platt et al.
(Continued)

FOREIGN PATENT DOCUMENTS

CN 103217667 A 7/2013
CN 110596467 A * 12/2019 ............. G01R 29/08
(Continued)

OTHER PUBLICATIONS

International Preliminary Report on Patentability for Application No. PCT/GB2021/053307, dated Jun. 29, 2023, 10 pages.
(Continued)

*Primary Examiner* — Bernarr E Gregory
(74) *Attorney, Agent, or Firm* — McCarter & English, LLP

(57) ABSTRACT
An Antenna Positioning System for missile seeker and system development and test comprises an antenna module, and a plurality of tethers, wherein the antenna module is suspended in a position by the tethers and the position is capable of being changed and the antenna module manoeuvred by pulling at least one tether and simultaneously releasing at least one tether. The system is useful for testing and developing Radio Frequency (RF) missile technology in a controlled, simulated environment rather than by live missile firings.

19 Claims, 6 Drawing Sheets

(56)          References Cited

U.S. PATENT DOCUMENTS

| | | | | |
|---|---|---|---|---|
| 5,028,932 | A * | 7/1991 | Boor .................... | H01Q 1/1264 |
| | | | | 343/741 |
| 5,440,476 | A * | 8/1995 | Lefkowitz ........... | G05B 19/251 |
| | | | | 376/310 |
| 5,786,680 | A * | 7/1998 | Klikier .............. | G01R 29/0814 |
| | | | | 318/696 |
| 6,809,495 | B2 * | 10/2004 | Rodnunsky .......... | F16M 11/425 |
| | | | | 318/649 |
| 11,435,649 | B2 * | 9/2022 | Wharton .............. | G03B 17/561 |
| 2005/0024005 | A1 * | 2/2005 | Rodnunsky ............ | B25J 9/0078 |
| | | | | 318/649 |
| 2009/0066100 | A1 * | 3/2009 | Bosscher ............. | B25J 17/0266 |
| | | | | 901/30 |
| 2011/0204197 | A1 * | 8/2011 | Wharton .............. | G03B 17/561 |
| | | | | 248/323 |
| 2013/0050652 | A1 * | 2/2013 | Wharton .............. | F16M 11/425 |
| | | | | 248/323 |
| 2013/0147671 | A1 * | 6/2013 | Schweppe .............. | H01Q 9/145 |
| | | | | 343/723 |

FOREIGN PATENT DOCUMENTS

| | | | | | |
|---|---|---|---|---|---|
| DE | 4342107 | A1 * | 6/1995 | ......... | G01R 19/0814 |
| EP | 2228781 | A2 * | 9/2010 | .............. | G09B 9/00 |
| WO | 2020/127984 | A1 | 6/2020 | | |

OTHER PUBLICATIONS

International Search Report and Written Opinion for Application No. PCT/GB2021/053307, dated Apr. 8, 2022, 12 pages.

* cited by examiner

PRIOR ART

ANTENNA POSITIONING SYSTEM

CROSS-REFERENCE TO RELATED APPLICATIONS

This application is a U.S. national stage filing, under 35 U.S.C. § 371(c), of International Application No. PCT/GB2021/053307, filed on Dec. 15, 2021, which claims priority to United Kingdom Patent Application No. 2019804.0, filed on Dec. 15, 2020. The entire contents of each of the aforementioned applications are incorporated herein by reference.

The present invention relates to an Antenna Positioning System (APS). The system has particular application in Hardware in the Loop simulation for missile Radio Frequency (RF) seeker and system development.

BACKGROUND OF THE INVENTION

It is desirable to test and develop missile technology in a controlled, simulated environment rather than by live missile firings. The cost savings are very significant and by testing in a secure environment secrecy and repeatability is assured. For these reasons, facilities are constructed that allow missile seeker, navigation and guidance systems to be tested and developed in a simulated environment.

Known simulation systems consist of the following parts:

Flight Motion Simulator

A Flight Motion Simulator (FMS) is used to hold missile hardware and simulate the body motion of a missile in flight so that seeker and navigation sensors are stimulated as though the missile is flying. The FMS simulates roll, pitch and yaw motions of the missile. FIG. 1 shows a typical FMS where an outer yoke represents a pitch axis, the middle yoke represents a yaw axis and an inner yoke represents a roll axis.

Target Motion Simulator

In general, a missile has a seeker which needs a source of targets to acquire, track and home against. A Target Motion Simulator (TMS) is placed in front of the seeker and comprises an antenna or antenna array mounted on an Antenna Positioning System (APS). The antenna(e) emits RF signals of the simulated targets, jammer(s) and environment and the positioning system moves the antenna in azimuth and elevation to simulate movement of the target.

A known embodiment of a TMS is shown in FIG. 2.

Unit Under Test

The Unit Under Test (UUT) are parts of the missile that typically comprises the seeker, Inertial Measurement Unit (IMU) and Guidance and Control Computer and associated sensors. The seeker and IMU is mounted in the FMS with the seeker facing the TMS. In the real world an active missile would transmit a RF pulse, then 'listen' for the target reflection or 'return'. In the simulation system, the UUT typically does not transmit a pulse, instead it outputs a transmit signal to a target generator.

Target Generator

The target generator produces a simulated target return in the frequency of interest and adds a range dependent time delay, environmental and/or counter measure effects and outputs these signals via the antenna(e) mounted on the Antenna Positioning System for the seeker to receive and process. A known embodiment of a target generator is shown in FIG. 3.

Simulation Computer

A simulation computer hosts a real-time 6 degree of freedom mathematical model of the rest of the missile sub-system and flight environment and performs aerodynamic and kinematic calculations to determine the simulated missile body angles and the flight paths of targets. Outputs from the UUT are fed into the simulation model which then drive co-ordinated responses to the FMS, APS and Target Generator.

The known system outlined above is a closed loop simulation system. The real hardware from a missile is used in the simulation which tests the assembly of mechanical, electrical, electronics and software as a whole entity. This form of simulation is generally referred to as Hardware in the Loop (HWIL) simulation. A known embodiment of a HWIL simulation is shown in FIG. 4.

Target Motion System

The size of TMSs vary depending on the required azimuth and elevation ranges for testing. It is also necessary for a target antenna to be beyond a 'Far Field' distance from the UUT. The 'Far Field' is the minimum distance between the target antenna on the APS and the antenna under test on the FMS. The 'Far Field' criterion ensures that RF emissions from the target antenna have a flat phase front when received by the antenna unit under test. The resultant low phase error ensures tracking and guidance errors are minimised. This distance, in conjunction with the required azimuth and elevation ranges, determines the overall size of an Antenna Positioning System.

Antenna Positioning System

The Antenna Positioning System positions the antenna in the required azimuth and elevation position required by the simulation. In the early stages of a real missile firing the intended target can be many kilometres away such that the angular movement of the target is comparatively small. The movement of the antenna on the Antenna Positioning System is equally small and slow. At the terminal phase of the simulation, where the missile is very close to the target, the angular positions, rates and accelerations change rapidly and hence the Antenna Positioning System must respond with comparatively fast and accurate movements.

It is important for the antenna to be positioned accurately so that the seeker's performance is not influenced by positional inaccuracies of the position system. Equally it is important that the antenna direct their transmissions straight at the seeker.

Antenna Positioning System Attributes

In summary, an Antenna Positioning System requires the following attributes:

1. A 'Far Field' distance between the emitting target antenna and the UUT receive antenna so that it receives a target signature with a flat phase front.

2. High rate and acceleration so that the simulation scenario can continue deep into the terminal phase of a simulation engagement to determine how close a simulated missile gets to a simulated target.

3. High positioning accuracy so that the seeker of the simulated missile receives maximum power radiated from the antenna and the guidance and control algorithms can best predict the simulated target's trajectory.

4. Good pointing accuracy of the antenna to the UUT so that the seeker receives an accurate transmission from the RF antenna.

5. A sufficiently large enough Field of Regard (FOR) to extend the simulation as close as possible to the simulated missile's point of impact or proximity to the simulated target. As the missile closes the target range, the target angle with respect to the flight path increases rapidly. As 'Far-Field' distances increase due to higher RF frequencies so does the required size of the motion system to provide a suitable FOR.

Types on Antenna Positioning Systems

There are a number of different known Antenna Positioning Systems available, but they fall into two main categories: linear or curved.

Linear Positioning System

A linear positioning system usually consists of a servo driven XY gantry with one or two targets moving in a flat XY plane to satisfy the requirement that the antenna always points at the seeker it is necessary for the antenna to be mounted on an additional pitch and yaw gimbal.

Disadvantages of a linear system are that the seeker works with angular rates and accelerations whereas the positioning system is acting along a linear plane. This means the antenna's rate and acceleration must increase the further it is from the centre. This effectively limits the size of the target operating range.

In addition to this, as the antenna moves away from the XY centre position the path length between the target antenna and UUT increases and the simulation has to compensate for these infinite variations to ensure the correct radiated power levels for the simulated missile to target range otherwise artificial errors will exist, effecting the fidelity of the simulation.

Curved Positioning System

To overcome the inherent problems of a linear system mentioned above, curved positioning systems have been used. They employ a spherical cap positioning system which can be curved in both azimuth and elevation. One known spherical cap positioning system is shown in FIG. 5.

In such a system the antenna always naturally points to the centre of rotation, the seeker, so it is unnecessary to employ an additional pitch and yaw gimbal on the Antenna Positioning System, as required with a linear system.

One other and perhaps more important feature of a spherical cap positioning system is that it is not necessary to compensate the RF signal for changes in distance to the seeker because the distance remains constant.

One disadvantage of a spherical cap positioning system is that it is more difficult to manufacture and install accurately making it generally more expensive than linear systems.

Positioning System Performance

In both cases (linear & spherical cap positioning systems) it is necessary to employ highly dynamic and accurate servo systems to achieve the positional accuracy and acceleration and rates of the Antenna Positioning System that seekers need for successful simulation.

This requirement is even more demanding when the 'Far Field' distance from the UUT to the target antenna must increase which would be necessary for systems in which higher RF frequencies and larger diameter receive antenna are used. If the far field increases from about 10 metres to about 20 metres the tangential acceleration and speed of the antenna positioning system must double for the same angular acceleration and angular rate as seen by the UUT.

Basic Market Information

RF HWIL missile testing facilities are expensive to build, run and maintain and are normally funded directly and indirectly by government defence requirements. There are sporadic demands for these systems around the world but as seeker RF frequencies increase, the need for a system which has suitable performance also increases.

In light of the problems discussed above, various proposals have been made, but there remains a need for an improved system which address one or more of the problems presented by prior art arrangements.

Therefore, there is a requirement for the supply of an Antenna Positioning System which has the necessary performance at greater far-field distances. In addition, there is a need for a new system which addresses the limitations of existing systems by achieving high angular rates and acceleration, at large far-field ranges and at a significantly reduced installed cost.

No traditional Antenna Positioning System would be able to achieve the same performance as the invention at large far-field distances.

SUMMARY OF THE INVENTION

In accordance with a first aspect of the present invention there is provided an antenna positioning system for missile seeker and system development and test which comprises an antenna module, and a plurality of tethers, wherein the antenna module is suspended in a position by the tethers and the position is capable of being changed and the antenna module manoeuvred by changing the length of at least one tether or tension in at least one tether.

Preferably, the position of the antenna module is capable of being changed and the antenna module manoeuvred by pulling at least one tether and simultaneously releasing at least one other tether.

Preferably, the antenna module provides a base for an antenna array assembly and the antenna module is a rigid structure designed to handle the acceleration loads imposed on it by the tethers. Preferably, the module is sufficiently stiff to ensure that an antenna array assembly mounted on the antenna module continues to point at the UUT during acceleration and motion.

Preferably, the antenna module is constructed to minimise its mass, whilst maintaining sufficient strength and stiffness. Advantageously, this ensures maximum dynamic performance.

Preferably, the antenna module is constructed from one or more of the materials selected from (i) plywood, blockboard or particle board; (ii) metal fabrication; (iii) metal castings; (iv) plastic fabrication; (v) plastic moulding; (vi) composite fabrication; and (vii) composite moulding.

Preferably, the antenna array assembly is attached to a face of the antenna module which faces the UUT. Preferably, the antenna array assembly is placed centrally in the antenna module. Preferably the antenna array assembly comprises a plurality of antennae and each antenna is angled to point at the centre of the UUT.

Preferably, the antenna array assembly comprises up to 5 antennae representing up to five targets and/or jammers. More preferably, the antenna array assembly comprises up to 3 antennae representing up to three targets and or jammers. To avoid interference with RF transmissions, the antenna module structure is preferably kept clear of the RF transmission lobes.

Preferably each tether is attached to the antenna module via an articulated joint. Advantageously, this allows the antenna module to attain a multitude of positions and orientation whilst the base end of the tether remains in a constant location.

Preferably, at least three tethers are provided.

Preferably, each tether is inelastic.

Preferably, the articulated joint has limited degrees of freedom. This provides the advantage of preventing unwanted flexibility.

Preferably, the positions of the tether attachments around the periphery and length of the module are optimised to provide the necessary motion and positional accuracy of the module.

Preferably, the antenna module has limited or no roll freedom. This provides the advantage that it avoids tethers conflicting with one another.

Preferably, the antenna module has an attachment point or points for an RF cable or cables. Preferably, the attachment point or points are positioned to minimise any additional mass or inertial load on the antenna module.

Preferably, the frontal dimensions and shape of the antenna module suit the requirements of the antenna array assembly. In this regard, preferably, the dimensions of the antenna module shall be suitable to position the tethers with enough spacing to give the module stability.

In one embodiment, an antenna module for a linear system comprises a triangular plate having three corners wherein a tether is attached at each of the three corners. It is preferable that a triangular antenna module is oriented such that the corners are at located at 60ƒ, 180ƒ and 300ƒ, where 0ƒ is vertically upwards. Preferably, the tethers attach to the module via a single axis rotational joint.

In an alternative embodiment, an antenna module for a 3D system comprises a hexagonal tube closed at an end of the tube to form a face onto which an antenna array assembly is mounted. Preferably, three tethers are attached to the periphery of the tube near the front face and spaced 120ƒ apart. Preferably, three further tethers are attached to the periphery of the tube near the other end of the tube and spaced 120ƒ apart but offset 60ƒ in relation to the front tethers. Preferably, each tether is attached to the module via a dual axis articulated joint. Preferably, the tube is internally structured to withstand forces exerted upon it by the tethers.

Advantageously, the antenna module can have any shape and does not necessarily have to be uniform along its length. In this regard, the 3D shape of the antenna module can take on infinite forms so long as the tethers have sufficient spatial separation to position the module within the required Field Of Regard and at the required orientation for the required operational radius.

In one embodiment, the antenna module is cylindrical. In another embodiment, the antenna module is non-cylindrical.

In one embodiment, the antenna module has a face which is circular.

In another embodiment, the antenna module has a face which is polygonal. Preferably, the antenna module has three to thirty sides. More preferably, the antenna module has three to twelve sides. Even more preferably, the antenna module has three to eight sides. Even more preferably, the antenna module has three to six sides.

Preferably, the antenna module is manufactured of aluminium. Alternatively, preferably, it is manufactured of synthetic material or composite material.

Preferably, the antenna module comprises a transmission device which transmits a signal preferably selected from a radio frequency (RF) signal, an infrared signal and a laser signal.

Preferably, the antenna module comprises a space frame or is fabricated or moulded.

Preferably, the antenna module is attached to each tether by a joint preferably selected from a ball joint, a 2 degrees of freedom joint and a pre-tensioned joint.

Preferably, the tethers are lengths of flexible material or components which at one end are attached to the antenna module and at the other end to a servo driven winch or pulley. Invariably the tethers are in tension to hold the antenna module in the required position and attitude. The tether lengths and tensions are changed in a controlled manner to achieve the required motion, position and attitude of the antenna module. The tethers can be made from suitable materials or components that can be drawn into a winch or through pulleys whilst maintaining the required tension to accelerate and position the antenna module. Suitable materials and components are:

1. Single strand metal or polymeric material
2. Metal, polymeric or composite multistrand cable
3. Metal, polymeric or composite multistrand flat braid
4. Single or double sided polymeric toothed belt reinforced with steel or Kevlar fibres
5. Metal, polymeric or composite chains The selection of the most appropriate tether material and form depends on the FOR, the dynamic mass of the pendant system, the required acceleration, the position within the pendant system and the safety factor. The tethers do not need to be the same type throughout the system. Tether material should be selected to give minimal extension under load.

A small, simple, planar pendant system with low dynamic requirements would require small cross-sectional tethers. Whereas a large FOR, 3D system with a large mass and high dynamics would require larger cross-sectional tethers. They would be required to withstand tensions between 50N and 10,000N, depending upon the quantity of tethers, the mass of the complete antenna module and the acceleration performance required. The cross-section of the tethers also depends on the number of tethers used in the system. Generally, as the number of tethers increase for any defined mass and acceleration, the tension in each tether decreases and hence the cross-sectional area can decrease. It is also likely that the cross-section of each tether will be different to best suit its position in the system. Tethers positioned above the antenna module will be subjected to greater tensions, than those below, as they have the additional force imposed on them by the mass of the antenna module. Therefore, the tethers above the antenna module are likely to have a greater cross section than those below the module.

In a simple planar pendant system, a minimum of three tethers are required to produce Azimuth and Elevation motion. Ideally these would be 120 degrees apart, one at 2 o'clock, one at 6 o'clock and the third at 10 o'clock.

A spherical cap pendant system requires five degrees of motion (Surge, Heave, Sway, Pitch and Yaw) to produce the required positioning and attitude of the antenna module and would need a minimum of six tethers.

An alternative spherical cap pendant system that utilises a pan and tilt mechanism on the face of the antenna module to mount the antenna array only requires three degrees of motion (Surge, Heave and Sway). To produce the required positioning of the antenna module it would need a minimum of six tethers.

The tethers are preferably all in tension to hold the antenna module in position, to accelerate it or deaccelerate it when changing position. The tension in each tether will be the tension required by each tether in contributing to the system's equilibrium depending on its position within the system.

Preferably, the plurality of tethers is arranged as pairs of tethers.

Advantageously, the number and positioning of the tethers allows the antenna module to be moved in up to and including six degrees of freedom. Six degrees of freedom (6DoF) refers to the freedom of movement of a rigid body in three-dimensional space. Specifically, the body is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis).

Preferably, the Antenna Positioning System comprises three to 30 tethers. More preferably, the Antenna Positioning System comprises 3 to 24 tethers. Even more preferably, the Antenna Positioning System comprises 3 to 16 tethers. Even more preferably, the Antenna Positioning System comprises 3 to 12 tethers.

In one embodiment, at least one tether (preferably each tether) is multistranded. In this regard, it comprises or consists of a plurality of strands. Preferably, the strands are of metal, coated metal or synthetic material.

In another embodiment, at least one tether (preferably each tether) comprises a flat braid. In this regard, it comprises or consists of a plurality of strands braided into a flat braid. Preferably, the strands are of metal, coated metal or synthetic material.

In another embodiment, at least one tether (preferably each tether) comprises a belt which is preferably a toothed belt. Preferably, the belt comprises teeth on only one side. Alternatively, preferably the belt comprises teeth on two sides. Preferably, the belt is manufactured of polyurethane. More preferably, the polyurethane has steel or synthetic reinforcement e.g. poly-paraphenylene terephthalamide (K29)—branded Kevlar®.

Preferably, the distance between the payload and the centre of rotation does not rely on a line between the antenna and payload. Instead, preferably, the distance is controlled by the coordinated lengths of the tethers.

Preferably, at least one tether is positioned below the height of the antenna module to maintain tension in one or more tethers positioned above the height of the antenna module. This provides the advantage of maintaining tension in the upper tethers and provides the advantage that it is capable of producing a downwards acceleration greater than acceleration provided by gravity. In addition, it provides the advantage that the invention does not rely on gravity alone to accelerate the antenna module downwardly. Instead, the tethers are arranged to move the antenna module vertically by applying forces from the tethers vertically, both downwards and upwards.

Furthermore, it provides the advantage that stability is provided by tethers acting above and below the antenna module. In this regard, the invention does not rely on external forces to tension the tethers. Advantageously, the tethers maintain the antenna module in position by applying an equilibrium of forces on the antenna module.

Preferably, each tether is attached to the antenna module and a winch. Preferably, the winch is a servo driven winch. In this regard, preferably, a plurality of servo driven winches is provided to pull and release the tethers.

Preferably, at least one winch (preferably each winch) is selected from a static drum winch, a pivoted drum winch or a pivoted toothed pulley, preferably with or without a take-up drum.

Preferably, at least one winch (preferably each winch) has a motor power of 50 W to 100 kW. More preferably, at least one winch (preferably each winch) has a motor power of 1 kW to 20 kW. Even more preferably, at least one winch (preferably each winch) has a motor power of 1 kW to 10 kW.

Preferably, at least one winch (preferably each winch) has gearing, preferably selected from direct drive, synchronous belt and gearbox type gearing. Preferably the gearbox type gearing is selected from planetary, zero backlash and helical type gearing.

Preferably, the position of the antenna module is capable of being changed and the antenna module manoeuvred by adjusting the length of the tethers between the antenna module and the winches.

Individual winches are required to shorten or lengthen individual tethers. The format and functionality of the winch must match the type of tether.

The motive element of the winch can be an electric, hydraulic or pneumatic motor which can be controlled in rate, acceleration and torque or force. The motor drives a drum, pulley or sprocket optionally via a gearing mechanism. The purpose of the optional gearing arrangement is to change the speed/torque profile of the motor to the required speed/torque requirement of the drum, pulley or sprocket. This in turn determines the speed and tension in the tether and ultimately with the set of tethers, the motion profile of the antenna module.

Preferably, feedback devices incorporated in at least one winch (preferably each winch) provide a control system with the instantaneous rotational position of the drum, pulley or sprocket of the winch and hence the length of the tether connected to that winch.

The various forms of winch which can perform the function of adjusting the tether lengths and tensions are:

1. Capstan Winch
2. Wound Drum Winch
3. Tooth Pulley Winch
4. Sprocket Winch

These are individually described as follows:

1. Capstan Winch

The capstan winch consists a drum round which the tether is wound and kept in tension around the drum by a tension device. The drum is actuated by a motor, via an optional gearing system, to shorten or lengthen the tether by rotating the drum round which the tether is wound. The tensioning system ensures the tether is held in contact with the drum to maintain enough friction that the tether rotates with the drum and does not slip.

2. Wound Drum Winch

The wound rum winch consists a drum round which a tether is wound and to which the tether end is firmly attached. As the drum rotates, in one direction the tether is shortened and the other, the tether is lengthened. The tether can either be wound in the same position such that the tether is wound onto itself, or spirally such that the tether is wound on the drum adjacent to the previous loop. The spiral wound tether requires a mechanism to advance the tether winding by at least the width of the tether for each drum rotation. The advance and retract system can be achieved by a mechanically or electrically driven mechanism.

3. Tooth Pulley Winch

If the tether is a single or double profile tooth belt the winch would employ a toothed pulley arrangement driven by a servo motor, optionally via a gearing system. The tooth belt will be gripped between pinch pulleys or wound round a toothed pulley for greater grip. The motor, via an optional gearing system, will turn the toothed pulley arrangement to lengthen or shorten the tether length. The excess tether which has been drawn needs to be contained and made readily available to the 'Tooth Pulley Winch' to play the belt back into the system to lengthen the tether.

4. Sprocket Winch

The sprocket winch is an assembly in which a chain sprocket is driven, via an optional gearing system, by a servo motor. The chain tether is wound around the sprocket and its rotation shortens or lengthens the tether. The chain which has been drawn by the sprocket is collected and played back out again by winding on a gathering drum or sprockets.

Preferably, each winch is fitted with an electronic measuring device or feedback device to continuously measure the length of tether between the winch and the antenna module. This will be an absolute or incremental encoder or resolver attached to the motor spindle, drum, or sprocket, measuring its rotation which will be proportional to the tether length.

It is necessary to determine a precise distance between the antenna module and the tether winches to make sure the correct tether length is played out. This becomes more important as the length of the tethers increase to a point where tether sag becomes significant.

Preferably, the winches incorporate one or more measuring devices which keep a continuous record of the tether length played out. As the tether length increases and tends towards the horizontal, the tether will sag such that the tether length will not equate to the actual distance of the antenna module to the winch. The sag will be negligible for short tether lengths that also tend towards the vertical.

Knowing the precise distance of the antenna module attachment point to the corresponding winch point is critical in maintaining accurate positioning and orientation of the antenna module. The main function of the tethers is to provide the motive force to accelerate the antenna module through a motion profile. The tethers will be subjected to relatively high tensile loads which means they need to be generally large in cross sectional area. This in turn means the tethers have a relatively high mass per metre which means they are more prone to significant sagging. Therefore, the motive tether winches cannot be relied upon to provide an accurate indication of the antenna module to winch distance.

What is required is an independent system to measure the antenna position accurately irrespective of the distance or attitude. Two solutions are offered here, a 'cord' actuated distance measuring device or a laser distance measuring device.

To provide a more accurate positional measurement of the antenna module, separate position feedback devices shall be employed. At least one feedback device is employed, preferably multiple devices shall be employed, preferably at least one adjacent to each winch.

One such device is a cord actuated measurement device. This is preferably a very lightweight, high tensile modulus cord wound round a very low inertia drum, kept under a constant low torque, connected to an incremental encoder, multi-turn absolute encoder or resolver. As the antenna module moves the cord is preferably drawn out or let in causing the drum and encoder or resolver to rotate thereby providing a distance measurement. The drum is preferably mounted on low friction bearings preferably air bearings and preferably kept subjected to a constant torque by a low inertia servo motor.

An alternative device is a laser measuring device. This device preferably comprises a laser distance measuring sensor, an antenna module mounted target and a mechanism to ensure the laser continuously points at the target. The laser distance measuring sensor preferably measures the distance of the antenna module mounted target from the known module position. The laser sensor is preferably kept pointing at the target by a mechanism guided by the tether attached to the antenna module. The divergence of the laser beam is sufficient to cater for any slight misalignment to the target. The antenna mounted target is preferably reflective to ensure the return of the laser beam to the sensor and is preferably shrouded to avoid interference from other laser sensors.

Preferably each laser operates at a different wavelength. Advantageously, this avoids interference.

The number of winches and the power of each winch is preferably determined by the pendant system performance requirement. The combined power of the winches must be sufficient to support the mass of the antenna module assembly and to accelerate the module according to the performance requirements. A pendant system can use different types and sizes of winches depending upon their position around the system circumference. Those winches acting above the pendant need to be more powerful than those below to provide the additional force necessary to support the antenna module's mass.

As each winch has a parasitic inertia, it is preferable to minimise the number of winches so as not to impose additional unwanted load on the whole pendant system.

A small simple linear pendant system preferably uses a minimum of three 100 W winches whereas a large 3D pendant system preferably uses a minimum of six 20 KW winches.

Preferably, a support structure is provided and the winches are arranged around the support structure. More preferably, the support structure comprises a frame. In one embodiment, the support structure supports a single antenna module. In an alternative embodiment, the support structure supports multiple antenna modules. Preferably, the number of multiple antenna modules is selected from 1 to 10 modules.

Advantageously, the invention does not require the use of vertical support columns and does not require at least three tethers per column. The invention addresses the need for accurate positioning suing multiple adjustable tethers attached to a support frame. In addition, preferably, the invention addresses the positional accuracy of the antenna module by the form of tether, the winch precision and an independent positional feedback device.

Preferably, the frame is arranged vertically. This provides the advantage that the winches are arranged relative to each other in one or more vertical planes.

More preferably, the number of multiple antenna modules is selected from 1 to 5 modules. Most preferably, the number of multiple antenna modules is 2 modules.

The radial position of the winches on the support structure preferably matches the radial arrangement of tether attachment points on the antenna module. The longitudinal spacing of the winches for the front and rear set of tethers must be sufficient to provide 3 degrees of motion (Surge, Heave and Sway) or 5 degrees of motion (Surge, Heave, Sway, Pitch and Yaw).

Preferably, the longitudinal position of each winch is fixed, fixed but adjustable or dynamically variable for different configurations or antenna module stability. This provides the advantage of providing the ability to move the attachment point dynamically relative to the support structure.

Alternatively, preferably, the longitudinal position of each winch is fixed with the tether passing through an adjustable or dynamically variable position pulley for different configurations or antenna module stability. Again, this provides the advantage of providing the ability to move the attachment point dynamically relative to the support structure.

Preferably, a dynamically variable pulley is positioned longitudinally using a linear servo motor mounted on a linear track with an integrated position feedback device.

In one embodiment, at least one feedback device (preferably each feedback device) is integrated into a winch. In this regard, preferably, the feedback device is drive integrated. Preferably, it is motor mounted, drum mounted or pulley mounted.

Alternatively, at least one feedback device (preferably each feedback device) is independent from a winch. In this regard, preferably, the feedback device is cord actuated or laser sensed. Preferably, the feedback device comprises an incremental encoder or an absolute encoder or resolver or laser distance sensor.

Preferably, a multi axis control system is provided capable of controlling the servo driven winches and linear servo motors to adjust the length of each tether between the antenna module and the winches to position the antenna module in the required position and orientation.

Preferably, the antenna positioning system comprises a control system. Preferably, the control system comprises a real time interface. Preferably, the control system comprises a digital positioning system. Preferably, the control system comprises one or more networked servo amplifiers.

The control system is preferably a multi axis servo system which provides co-ordinated control of each winch and linear motor to wind in, or to let out the tethers to position the antenna module at the required azimuth and elevation position and at the required orientation.

The control system is sent a series of data from the HWIL host computer, including but not limited to position, rate and acceleration, defining the required motion profile of the antenna module. The control system will translate these data using inverse kinematics into individual tether lengths to control the winches.

The control system is a closed loop system where the actual tether length, rate and torque is fed back from the winch, or by separate feedback devices, or collectively, to the controller where it is compared to the demanded length, rate and torque. Preferably, the control system continuously drives the winch(es) in the required direction to match the actual length, rate and torque with the demanded length, rate and torque using one or more of Proportional, Integral, Derivative (PID) and feed-forward control. In a preferred embodiment, all of Proportional, Integral, Derivative (PID) and feed-forward control are employed.

Preferably, servo amplifiers provide electrical power to the servo motors causing the motors to rotate at the required rate and with the necessary torque as demanded by the control system output.

Preferably, servo valves provide control of hydraulic fluid or compressed air to the motors causing the motors to rotate at the required rate and with the necessary torque as demanded by the control system output.

Preferably, the antenna positioning system comprises means for cable management. In this regard, preferably the means comprises a number of pendant looms. Preferably 1 to 5 pendant looms are provided. More preferably 1 to 3 pendant looms are provided. Even more preferably, a single pendant loom is provided.

Preferably, the Antenna Positioning System comprises a safety system. In this regard, preferably, the Antenna Positioning System shuts down in the event that an error is detected by the control system.

BRIEF DESCRIPTION OF THE DRAWINGS

The invention will now be further described with reference to the accompanying drawings in which.

DETAILED DESCRIPTION OF THE INVENTION

Figure 1:
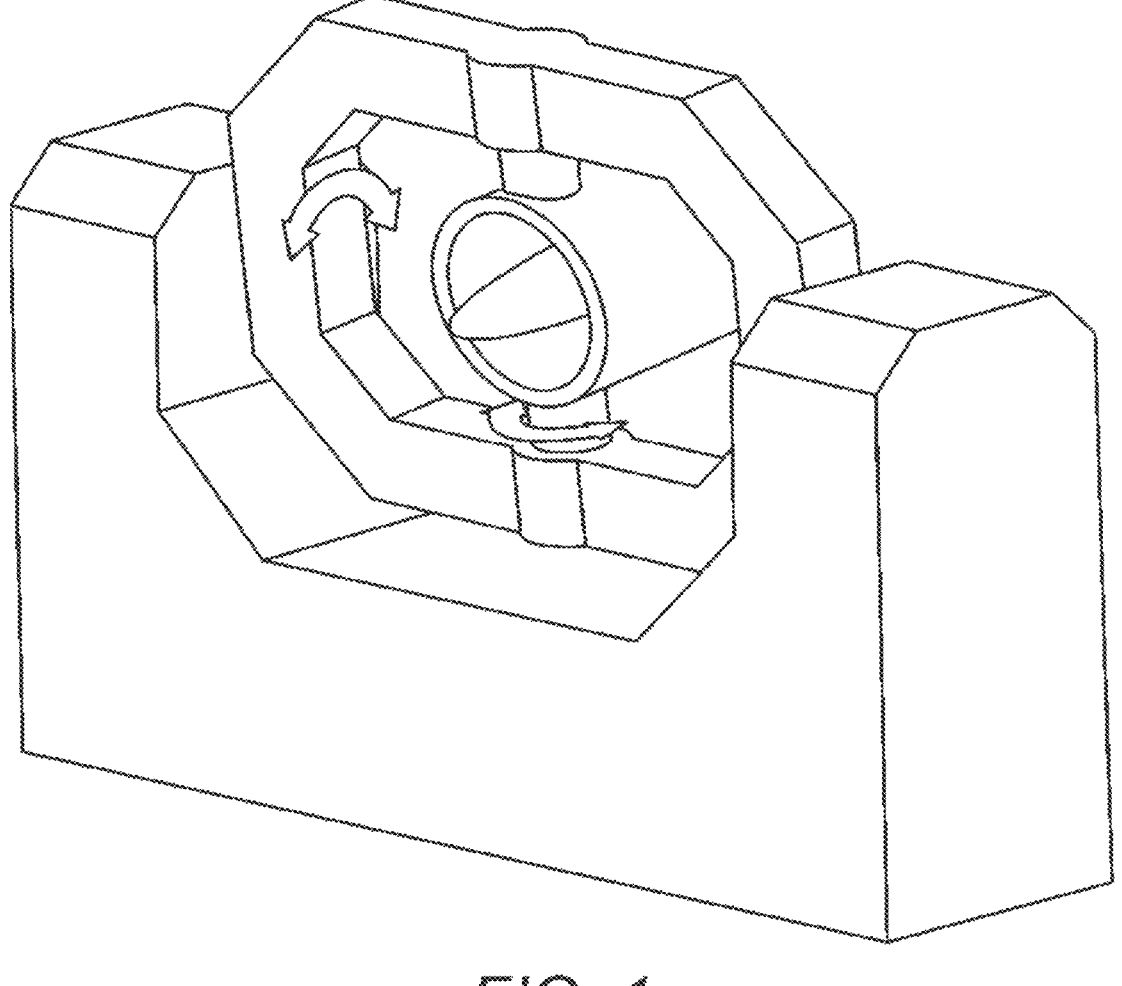
FIG. 1 shows a view of a known typical Flight Motion Simulator (FMS)
Figure 2:
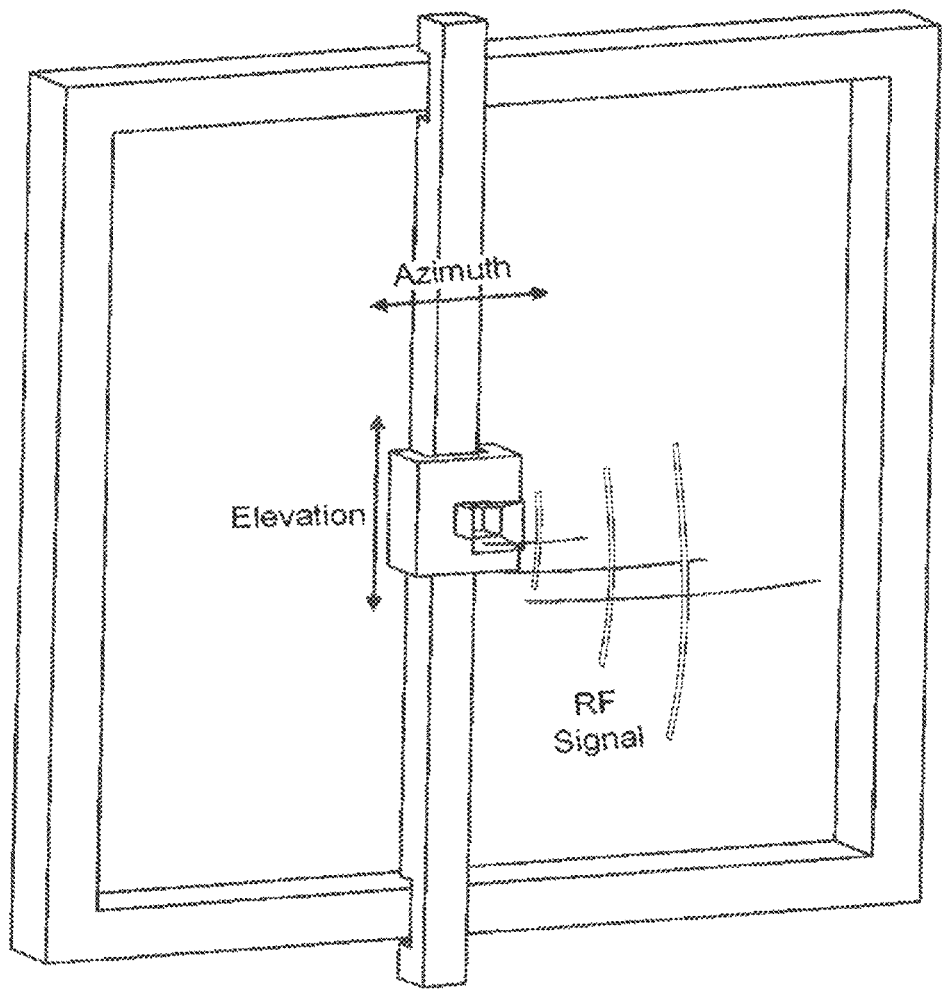
FIG. 2 shows a view of a known Target Motion Simulator (TMS)
Figure 3:
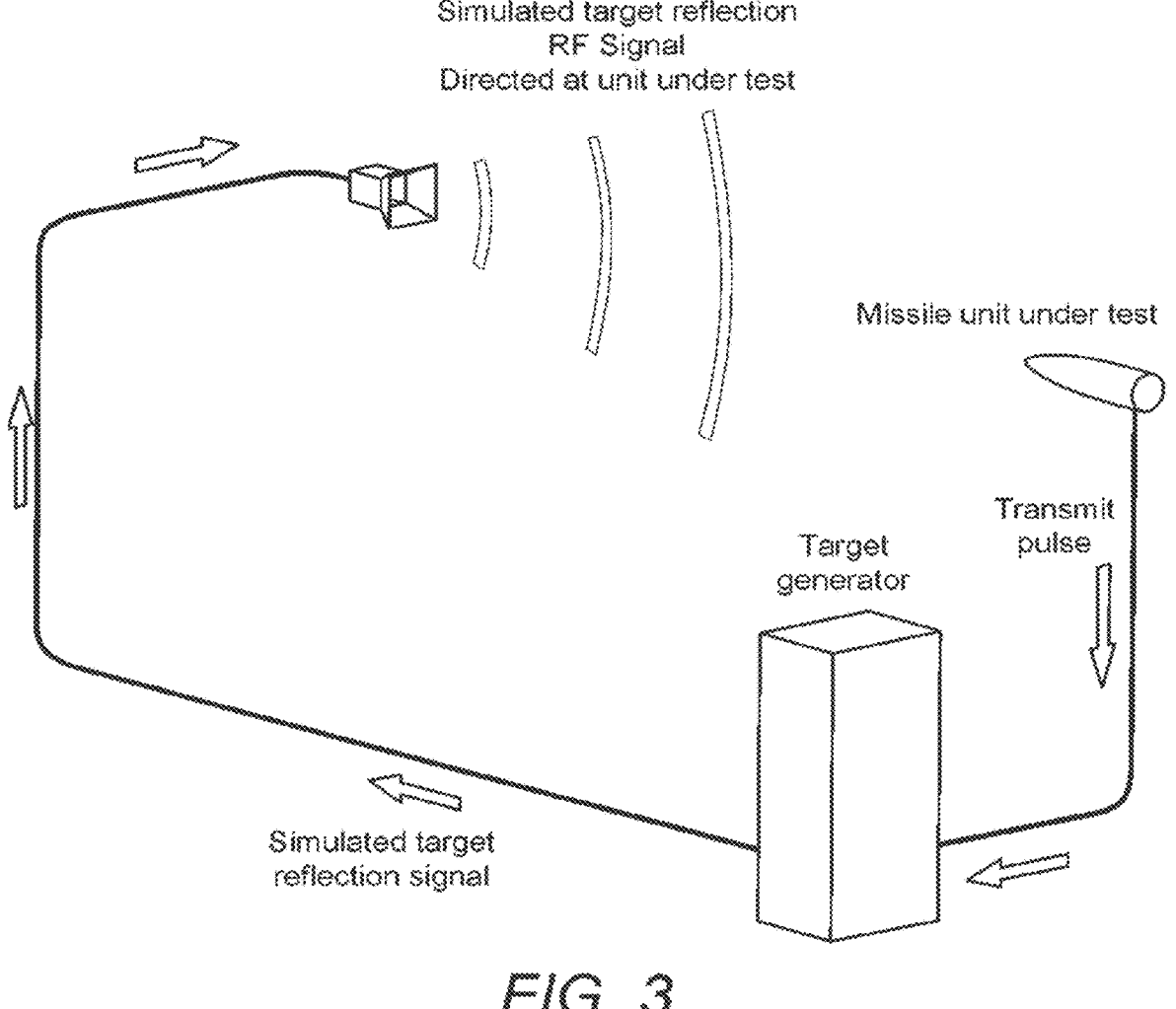
FIG. 3 shows a view of a known Target Generator.
Figure 4:
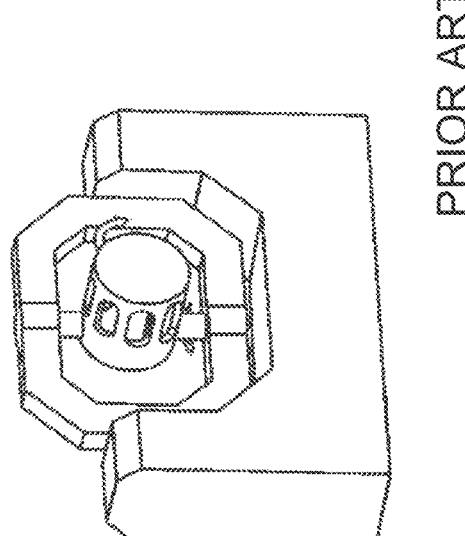
FIG. 4 shows a known Hardware in the Loop system.
Figure 4:
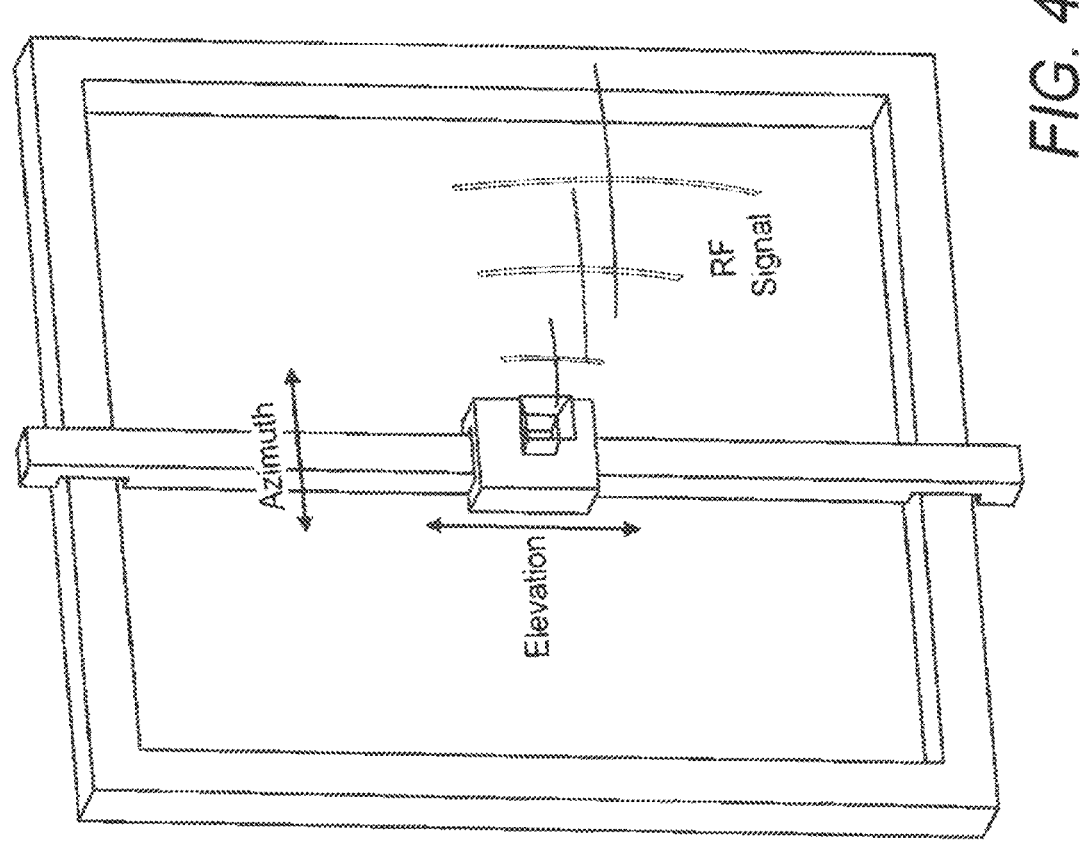
Figure 5:
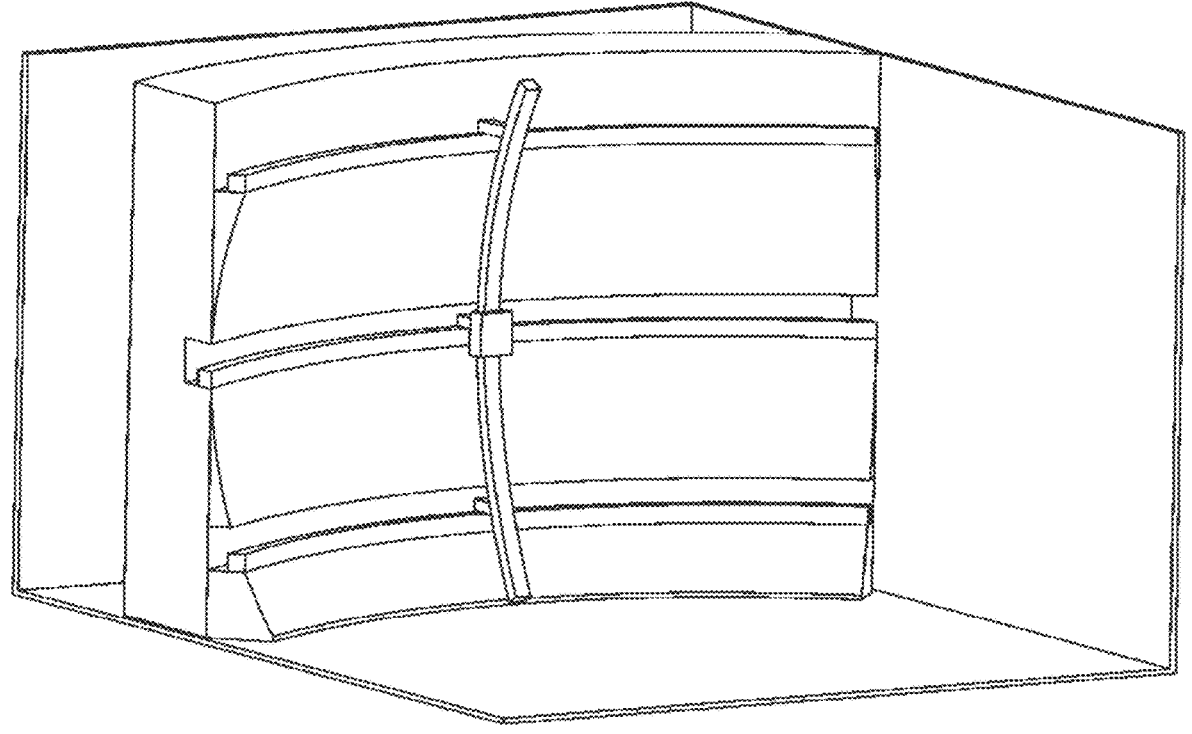
FIG. 5 shows a view of a known Antenna Positioning System curved in both azimuth and elevation.

It will be appreciated that aspects, embodiments and preferred features of the invention have been described herein in a way that allows the specification to be written in a clear and concise way. However, unless circumstances clearly dictate otherwise, aspects, embodiments and preferred features can be variously combined or separated in accordance with the invention. Thus, preferably, the invention provides a device having features of a combination of two or more, three or more, or four or more of the aspects described herein. In a preferred embodiment, a device in accordance with the invention comprises all aspects of the invention.

Within the context of this specification, the word "about" means plus or minus 20%, more preferably plus or minus 10%, even more preferably plus or minus 5%, most preferably plus or minus 2%.

Within the context of this specification, the word "comprises" means "includes, among other things" and should not be construed to mean "consists of only".

Within the context of this specification, the word "substantially" means preferably at least 90%, more preferably 95%, even more preferably 98%, most preferably 99%.

Within the context of this specification, the term "antenna array assembly" means an assembly comprising a plurality of antennae.

Within the context of this specification, the word "tether" means for example cable, cord, cordage, rope, or webbing, for example in the form of braided, woven, or twisted fibres in a long length. Preferably, the tether provides a substantially flexible link, attached to the antenna module that can be shortened or lengthened.

Suitable tethers include:
1. Single strand wire
2. Coated single strand wire
3. Wire rope
4. Coated wire rope
5. Synthetic cord
6. Synthetic rope
7. Synthetic woven tape
8. Synthetic belt
9. Toothed synthetic belt
10. Chain Within the context of this specification, the word "winch" means a motorised device to shorten or lengthen the length of the tether between a winch and an antenna module. The winch is a servo-controlled motor which adjusts the length of the tether according to demands from the multi axis digital controller. In the case where the tether is a wire, rope, cord, tape or belt, the winch is provided in the form of a capstan where the tether is wound onto a drum. If the tether is a toothed belt or chain the winch is provided in the form of a toothed pulley arrangement. If the tether is in the form of a tape or belt, the 'winch' assembly needs to be mounted on a pivot so that the winch is always acting at 90∫ to the tape or belt centreline.

Figure 6:
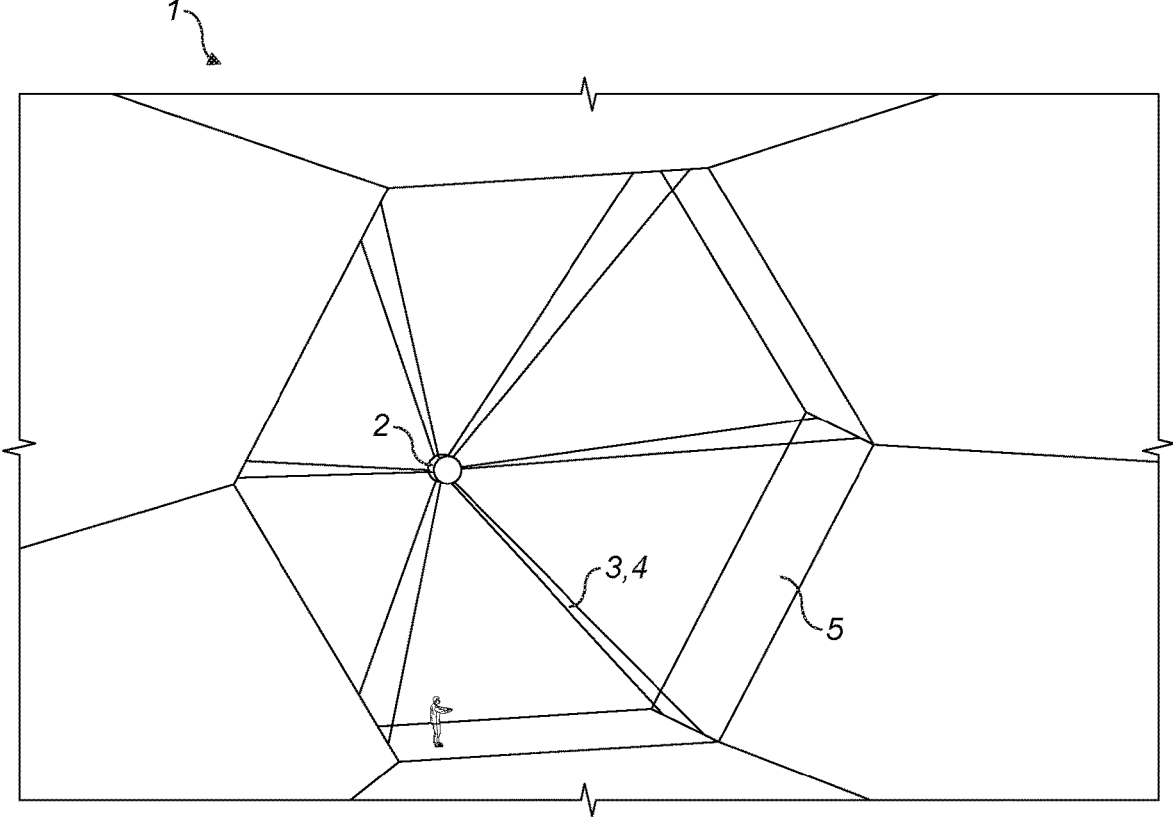
FIG. 6 shows a view of an embodiment according to the present invention.

As shown in FIG. 6, the present invention provides an antenna positioning system (1) which comprises an antenna module (2) suspended and manoeuvred by a series of tethers (3) in the form of cables (4) attached to servo driven winches. Advantageously, the number and positioning of the cables (4) allows the antenna module (2) to be moved in up to and including six degrees of freedom.

The servo driven winches are controlled by a multi axis control system which adjusts the length of each cable (4) to position the antenna module (2) in the required position and orientation.

The quantity and positioning of the cables (4) depends upon the required motion of the antenna module (2).

Without wishing to be bound by theory, there are an infinite number of cable (4) configurations, so the following descriptions assume a symmetrical and basic arrangement for simplicity.

Single Plane Motion

In a first embodiment, to move the antenna module (2) across a XY plane the cable winches are arranged in a substantially vertical plane. The precise number and positioning of the winches depends upon the range of motion required. If this configuration is used for RF seeker testing the antenna array on the antenna module (2) must be mounted on a two axis gimbal (pitch and yaw) so that the antenna is pointed always at the centre of the UUT.

3D Motion—3 DOF Pendant

In a second embodiment, to move the antenna module (2) in azimuth and elevation whilst maintaining a constant distance from the centre of rotation the module (2) has 3 degrees of freedom (3 DOF). These are, Surge, Heave and Sway. To achieve this range of motion, two pitches of winches are provided with each pitch of winches arranged in a frame (5) around the antenna module (2). The number and position of the winches does not have to be uniformly spaced around the frame (5). For instance, it could be desirable to skew the distribution of winches towards the top of the frame (5) to counteract the bias of gravity on performance. If this configuration is used for HWIL RF seeker testing the antenna array on the antenna module (2) must be mounted on a two axis gimbal (pitch and yaw) so that the antenna is pointed always at the centre of the UUT.

3D Motion—5 DOF Pendant

In a third embodiment, to move the antenna module (2) in azimuth and elevation whilst maintaining a constant distance from the centre of rotation and point at the centre of rotation the module has 5 degrees of freedom (5 DOF). These are, Surge, Heave, Sway, Pitch and Yaw. To achieve this range of motion, two pitches of winches are provided with each pitch of winches arranged in a frame (5) around the antenna module (2). The number and position of the winches does not have to be uniformly spaced around the frame (5). For instance, it could be desirable to skew the distribution of winches towards the top of the frame (5) to counteract the bias of gravity on performance.

The quantity of winches can be varied to provide more stability to the antenna module or to increase positioning and pointing accuracy. Indeed, due to the difference in the geometry of the front and rear pitches, concave versus convex, the number and positioning of winches may differ between the front and rear pitches.

The antenna module (2) is attached to the plurality of tethers with flexible connections to allow the module (2) to take up the required position. The module's (2) outer structure is rigid and suitably strong to withstand tension from the tethers (3). An antenna array is attached to the front of the antenna module (2).

A multi-axis controller is provided to co-ordinate the position (length of tethers (3) between the antenna module (2) and the winches), rate and acceleration of each winch in order to move the antenna module (2) along a required motion path at the required velocity. Position feedback from each winch and or each independent feedback device is used by the controller to close the servo position loop.

Independent cord-actuated encoders or laser distance sensors provide accurate feedback in relation to the position of the antenna module (2). These encoders or sensors are positioned adjacent to the winches to measure the distance to the antenna module (2) from the winch position.

The multi-axis controller uses inverse kinematics to control the position, rate and acceleration of the antenna module (2) as required by the real time simulation computer.

The winches are arranged in a pattern and they are attached to a frame support structure (5). The support structure (5) resists tension from the tethers (3) due to the acceleration of the antenna module (2). The support structure (5) also provides a means to maintain the winches. In this regard, the support structure (5) is relocatable along the Z axis. This provides the advantage of allowing the system's azimuth, elevation and 'far-field' distances to be changed within the dimensional constraints of the design.

Advantageously, if a multi target system is required, a plurality of single antenna systems can be arranged in tandem each operating at their respective radii which would be at or greater than the far-field distance of the UUT.

In addition, the inertia of the antenna module (2) and tethers (3) is considerably less than the inertia provided by a traditional system of comparable size. This means that for comparable power input the invention provides greater acceleration for the antenna module (2). As known systems are increased in size to provide a greater field of regard, the inertia generally increases proportionally. This is not the case for the invention as the inertia of additional tether (3) lengths is proportionally small.

Furthermore, known systems require guide tracks for the antenna module (2) to run along and these tracks have rate limitations. The invention overcomes this limitation as the invention does not require guide tracks.

The infrastructure of known systems is expensive per square degree and the increase in infrastructure cost is relatively proportional the larger the system requirement. In contrast, a system (1) according to the invention can be made larger with relatively small increases in costs as the infrastructure merely requires marginal changes. This means that customers can more easily afford greater fields of regard.

The Far-Field radius can be made adjustable by software reconfiguration of the antenna module's radius and making the support structure (or FMS) moveable along the Z axis. This allows different types of missile seekers to be developed at the same facility with an optimum far-field radius and FOR.

Advantageously, winches can be selected to make it easy to change the rate and acceleration for a given power input. This can be achieved by changing gearing, a pulley size or by selecting a different drum size for the winch.

The system of the invention can be designed to provide a range of configurations to best suit a range of seekers. This flexibility of rate, acceleration, far-field radius and field of regard would make the facility more cost effective in catering for different seekers.

Advantageously, the concept system negates the need for expensive infrastructure components and would be increasingly competitive as systems become larger.

The above described embodiments have been given by way of example only, and the skilled reader will naturally appreciate that many variations could be made thereto without departing from the scope of the invention.

The invention claimed is:

1. An antenna positioning system which comprises:
an antenna module; and
a plurality of tethers, wherein the antenna module is:
suspended in a position by the plurality of tethers, and wherein:
(a) the antenna module is manoeuvred in response to pulling at least one tether and simultaneously releasing at least one other tether;
(b) the antenna module provides a base for an antenna array assembly, and the antenna module is a rigid structure designed to handle acceleration loads imposed on the antenna module by the plurality of tethers;
(c) the antenna module is constructed from one or more of the materials selected from a group consisting of: plywood, blockboard or particle board, metal fabrication, metal castings, plastic fabrication, plastic moulding, composite fabrication, and composite moulding; and wherein:
i. the antenna array assembly is placed centrally in the antenna module; or
the antenna array assembly is attached to a face of the antenna module which faces a Unit Under Test (UUT).

2. The antenna positioning system of claim 1, wherein each tether is attached to the antenna module via an articulated joint; wherein:
the articulated joint has a limited number of degrees of freedom; or
the plurality of tethers are attached around a periphery and a length of the antenna module at positions optimised to provide necessary motion and positional accuracy of the antenna module; or
the antenna module has limited or substantially no roll freedom.

3. The antenna positioning system of claim 1, wherein the antenna module has one or more attachment points for attaching to one or more RF cables, wherein the plurality of tethers comprises the one or more RF cables.

4. The antenna positioning system of claim 1, wherein the antenna module has frontal dimensions and a shape to suit requirements of the antenna array assembly; wherein:
(i) the antenna module comprises a triangular plate having three corners wherein a tether of the plurality of tethers is attached at each of the three corners.

5. The antenna positioning system of claim 1, wherein:
(a) the antenna module has a face which is circular or polygonal; or
(b) the antenna module has three to thirty sides.

6. The antenna positioning system of claim 1, wherein:
(a) the antenna module is manufactured of aluminium, synthetic material or composite material; or
(b) the antenna module comprises a transmission device which transmits a signal, wherein the signal is a radio frequency (RF) signal, an infrared signal or a laser signal; or (c) the antenna module comprises a space frame or is fabricated or moulded.

7. The antenna positioning system of claim 1, wherein:
(a) each tether comprises a length of flexible material or components having a first end which is attached to the antenna module and a second end which is attached to a winch or pulley; or
(b) each tether is of suitable materials or components that can be drawn into a winch or through pulleys whilst maintaining the tension as required to manoeuvre the antenna module, the suitable materials or components selected from a group consisting of: (i) single strand metal or polymeric material, (ii) metal, polymeric or composite multistrand cable, (iii) metal, polymeric or composite multistrand flat braid, (iv) single or double sided polymeric toothed belt reinforced with steel or polyparaphenylene terephthalamide fibres, or (v) metal, polymeric or composite chains; or
(c) a tether of the plurality of tethers positioned above the antenna module has a greater cross section than a tether of the plurality of tethers positioned below the antenna module.

8. The antenna positioning system of claim 1, wherein the antenna positioning systems comprises:
(a) a minimum of three tethers, each of which are positioned about 120 degrees apart radially; or
(b) a minimum of six tethers; or
(c) each tether is in tension to hold the antenna module in position; or
(d) three to 30 tethers.

9. The antenna positioning system of claim 1, wherein;
(a) at least one tether is multistranded; or
(b) at least one tether comprises a flat braid; or
(c) at least one tether comprises a belt, wherein the belt is a toothed belt.

10. The antenna positioning system of claim 1, wherein a support structure is provided and winches are arranged around the support structure, wherein:
(a) the support structure comprises a frame having a front side and a rear side, opposite the front side; or
(b) a radial position of the winches on the support structure matches a radial arrangement of tether attachment points on the antenna module; or
(c) a longitudinal spacing of the winches for tethers of the front side and for tethers of the rear side is sufficient to provide 3 degrees of motion, the 3 degrees of motion comprising Surge, Heave and Sway, or 5 degrees of motion, the 5 degrees of motion comprising Surge, Heave, Sway, Pitch and Yaw.

11. The antenna positioning system of claim 10, wherein a longitudinal position of the winches is fixed, fixed but adjustable, or dynamically variable.

12. The antenna positioning system of claim 10, wherein a longitudinal position of the winches is fixed with a tether passing through an adjustable or dynamically variable position pulley.

13. The antenna positioning system of claim 12, wherein a dynamically variable position pulley is positioned longitudinally using a linear servo motor mounted on a linear track with an integrated position feedback device.

14. The antenna positioning system of claim 1, further comprising:
a multi axis control system for controlling servo driven winches; and linear servo motors to adjust a length of each tether between the antenna module and the servo driven winches to position the antenna module in the required position and orientation.

15. The antenna positioning system of claim 1, further comprising a control system.

16. The antenna positioning system of claim 15, wherein the control system is a multi-axis servo system providing co-ordinated control of a winch and linear motor to wind in, or to let out tethers to position the antenna module at the required azimuth and elevation position and at the required orientation.

17. The antenna positioning system of claim 15, wherein the control system receives a series of data from a Hardware in the Loop (HWIL) host computer, including but not limited to position, rate and acceleration, defining a required motion profile of the antenna module.

18. The antenna positioning system of claim 15, further comprising a safety system which shuts down the Antenna Positioning System in the event that an error is detected by the control system.

19. The antenna positioning system of claim 1, wherein:
the antenna array assembly comprises a plurality of antennae and each antenna of the plurality of antennae is angled to point at the centre of the Unit Under Test (UUT), and the antenna array assembly comprises:
up to 5 antennae representing, in a simulated environment, up to five targets and or jammers, or up to 3 antennae representing, in the simulated environment, up to three targets and or jammers,
the tether is attached to the antenna module via a single axis rotational joint, or
the antenna module comprises a tube closed at an end of the tube to form a face onto which the antenna array assembly is mounted, or
the tube is hexagonal, or
a first set of three tethers of the plurality of tethers are attached to a periphery of the tube near a front of the face and spaced 120 degrees apart, or
a second set of three tethers, that are different than the three tethers in the first set are attached to the periphery of the tube near an end of the tube opposite the front of the face, and spaced 120 degrees apart but offset 60 degrees in relation to the first set of tethers, or
each tether is attached to the module via a dual axis articulated joint.

\* \* \* \* \*